United States Patent
Wang

(10) Patent No.: US 8,554,232 B2
(45) Date of Patent: Oct. 8, 2013

(54) METHOD AND SYSTEM FOR A WIRELESS MULTI-HOP RELAY NETWORK

(75) Inventor: Guo Qiang Wang, Kanata (CA)

(73) Assignee: Apple Inc., Cupertino, CA (US)

( * ) Notice: Subject to any disclaimer, the term of this patent is extended or adjusted under 35 U.S.C. 154(b) by 1135 days.

(21) Appl. No.: 11/478,719

(22) Filed: Jul. 3, 2006

(65) Prior Publication Data

US 2007/0072604 A1 Mar. 29, 2007

Related U.S. Application Data

(60) Provisional application No. 60/709,052, filed on Aug. 17, 2005.

(51) Int. Cl.
*H04W 40/00* (2009.01)

(52) U.S. Cl.
USPC .......... 455/445; 370/351; 370/392; 370/397; 370/395.31; 370/409

(58) Field of Classification Search
USPC ............... 370/389, 351–356, 392, 397, 399, 370/395.31, 409; 455/445
See application file for complete search history.

(56) References Cited

U.S. PATENT DOCUMENTS

| | | | |
|---|---|---|---|
| 2003/0091014 A1 | 5/2003 | Meier | |
| 2003/0125067 A1 | 7/2003 | Takeda et al. | |
| 2005/0014464 A1 | 1/2005 | Larsson | |
| 2005/0018679 A1* | 1/2005 | Iwami ........................... | 370/392 |
| 2005/0068933 A1 | 3/2005 | Kokkonen et al. | |
| 2005/0078659 A1* | 4/2005 | Ashwood Smith ........... | 370/352 |
| 2005/0265329 A1* | 12/2005 | Havala et al. ................ | 370/389 |
| 2005/0265360 A1* | 12/2005 | Kim et al. ..................... | 370/400 |
| 2006/0130126 A1* | 6/2006 | Touve et al. .................. | 726/5 |
| 2006/0160536 A1* | 7/2006 | Chou .......................... | 455/435.1 |

FOREIGN PATENT DOCUMENTS

| | | |
|---|---|---|
| EP | 1480387 A1 | 11/2004 |
| WO | WO 2005/025110 A2 | 3/2005 |

OTHER PUBLICATIONS

Johnson, David B., et al, "The Dynamic Source Routing Protocol for Mobile Ad Hoc Networks (DSR)", Jul. 19, 2004, IETF MANET Working Group Internet-Draft, pp. 1-108 http://www.ietf.org/internet-drafts/draft-ietf-manet-dsr-10.txt.

Jamoussi, B., et al, "Constraint-Based LSP Setup using LDP", Jan. 2002, Network Working Group, pp. 1-38 http://www.ietf.org/rfc/rfc3212.txt.

Shen, Gang et al., "Recommendations on IEE 802.16j; IEEE C802.16j-06/004r1," May 8, 2006, p. 1-14, Tel Aviv, Israel, XP002629650, <http://www.ieee802.org/16/relay/contrib/C80216j-06_004r1.pdf>.

(Continued)

*Primary Examiner* — Wayne Cai

(74) *Attorney, Agent, or Firm* — Meyertons, Hood, Kivlin, Kowert & Goetzel, P.C.

(57) ABSTRACT

A Point to Multipoint (PMP) multi-hop relay network includes a base station, one or more relay stations and one or more subscriber stations. Active service flows in a PMP multi-hop relay network have a 16-bit connection identifier (CID). A CID defines the connection that a packet is servicing. Before traffic can be transmitted, the path through the network, and the association of CIDs with respective hops needs to be established. The CID mapping relationship from the ingress air link to the egress air link at each relay station is first set up, which is then followed by a traffic phase where the CID mapping relationship is used to route traffic from a base station to a subscriber station.

20 Claims, 12 Drawing Sheets

(56) References Cited

OTHER PUBLICATIONS

Unknown Author, "IEEE Standard for Local and Metropolitan Area Networks Part 16: Air Interface for Fixed Broadband Wireless Access Systems; IEEE Std 802.16-2004 (Revision of IEEE Std 802.16-2001) ED—Anonymous," Jan. 1, 2004, p. 1-857, IEEE Standard, IEEE, Piscataway, NJ, XP017603700.

European Search Report for European Patent Application 06775063.8 mailed Apr. 1, 2011, 7 pages.

Kamlesh Rath et al., "Scalable Connection Oriented Mesh Proposal," IEEE 802.16 Broadband Wireless Access Working Group, Mar. 6, 2003, http://www.ieee802.org/16/tgd/contrib/C80216d-03_18.pdf, 21 pages.

Examination Report for European Patent Application No. 06775063.8 issued Dec. 27, 2011, 5 pages.

European Search Report for European Patent Application No. 06775063.8 issued Apr. 1, 2011, 7 pages.

Pabst, Ralf et al.; Relay-Based Deployment Concepts for Wireless and Mobile Broadband Radio, Wireless World Research Forum, IEEE Communications Magazine, Sep. 2004, pp. 80-89.

* cited by examiner

METHOD AND SYSTEM FOR A WIRELESS MULTI-HOP RELAY NETWORK

RELATED APPLICATIONS

This application claims the benefit of U.S. Provisional Patent Application No. 60/709,052 filed on Aug. 17, 2005, which is hereby incorporated by reference in its entirety.

FIELD OF THE INVENTION

The invention relates to wireless signalling protocols and systems.

BACKGROUND OF THE INVENTION

WiMAX is described in the IEEE 802.16 Wireless Metropolitan Area Network (MAN) standard. WiMAX allows for high-speed wireless data transmissions over long distances.

The core components of an 802.16 network are base stations (BS) and subscriber stations ((SS), sometimes referred to as mobile stations (MS)). The IEEE 802.16-2005 standard (formerly named but still known as IEEE 802.16e or Mobile WiMAX) is designed to support Point-to-Multipoint (PMP).

In PMP mode, the BS and one or more SS's are organized into a cellular-like structure. This type of network requires that all SS be within the transmission range and clear line of sight of the BS which uses an omnidirectional antenna. The BS controls activity within the cell, including access to the network by a SS, and allocations to achieve quality of service (QoS). FIG. 1A is a pictorial view of a PMP network in which BS 50 is in PMP communication with SS 52, SS 53, SS 54 and SS 55. FIG. 1B is a schematic diagram of a very simple PMP network in which BS 12 is in point-to-multipoint communication with both SS 14 and SS 16.

But in cellular-like PMP mode, there are many limitations such as cell transmission coverage, frequency re-use, power consumption, system capacity and performance beyond the boundaries of the BS coverage area. These limitations would cause signal degradation such as path loss, shadowing, and increase the complexity for handover in a large scale and high-speed mobility environment.

SUMMARY OF THE INVENTION

According to a broad aspect of the invention, there is provided a method for routing messages in a wireless multi-hop relay network comprising a base station, at least one relay station, and a subscriber station, the method comprising: a. the base station sending a signalling message containing a path list, and an initial connection identifier (CID) for a connection between the base station and one of the at least one relay stations; b. one of the at least one relay stations receiving the signalling message and replacing the CID contained in said signalling message with a new CID and forwarding the signalling message with the new CID, and c. repeating step b. until the subscriber station is reached.

In some embodiments, the path list is a set of node identifiers for all nodes between the base station and the subscriber station. In some embodiments the path list is stored in a Medium Access Control (MAC) sub-header and the MAC sub-header is a relay sub-header.

In some embodiments, the CID is stored in a Dynamic Service (DSx) message, and the DSx message is a Dynamic Service Addition (DSA) message.

In some embodiments the initial CID and the new CID are transport CIDs. In some embodiments, the initial CID and the new CID are tunnel CIDs.

In some embodiments, each of the at least one relay stations creating an entry in a CID mapping table, the CID mapping table containing entries for each CID received in a signalling message, and for each new CID replaced.

In some embodiments, the method is applied to a WiMAX wireless network.

In some embodiments, the method further comprises, d. the base station sending a frame containing a DL MAP and at least one DL Burst, the DL MAP containing a CID stack for a connection between the base station and one of the at least one relay stations; e. one of the at least one relay stations receiving the frame and replacing the CID stack contained in said DL MAP with a new CID stack and forwarding the frame with the new CID stack, and f. repeating step e. until the subscriber station is reached.

In some embodiments, the method further comprises: d. the base station sending a frame containing a DL MAP and at least one DL burst, the DL burst containing one or more Medium Access Control (MAC) messages but not containing a CID stack, each of the one or more MAC messages containing an initial transport CID for a connection between the base station and one of the at least one relay stations; e. one of the at least one relay stations receiving the one or more MAC messages and replacing the transport CID contained in at least one of said MAC messages with a new transport CID and forwarding the MAC message with the new transport CID, and f. repeating step e. until the subscriber station is reached.

A relay station in a wireless multi-hop relay network comprising: a CID mapping table; a CID distribution controller for receiving a signalling message sent from another station, the signalling message containing an ingress CID and a path list, the CID distribution controller adapted to allocate a corresponding egress CID based on the path list, and for creating an entry in said CID mapping table for each of the ingress CID and its corresponding egress CID; and a CID swapper for replacing the ingress CID in the signalling message with the egress CID.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A wireless multi-hop relay access network is described herein. In a multi-hop relay access network, relay stations (RS's) are introduced for fixed, nomadic and mobile relay usage. The functional scope of a relay station can scale from being very simple such as an analog signal repeater, to a base station compliant fully functional device capable of radio resource scheduling, security authentication and connection management for mobile stations, in case a base station fails.

Figure 2:
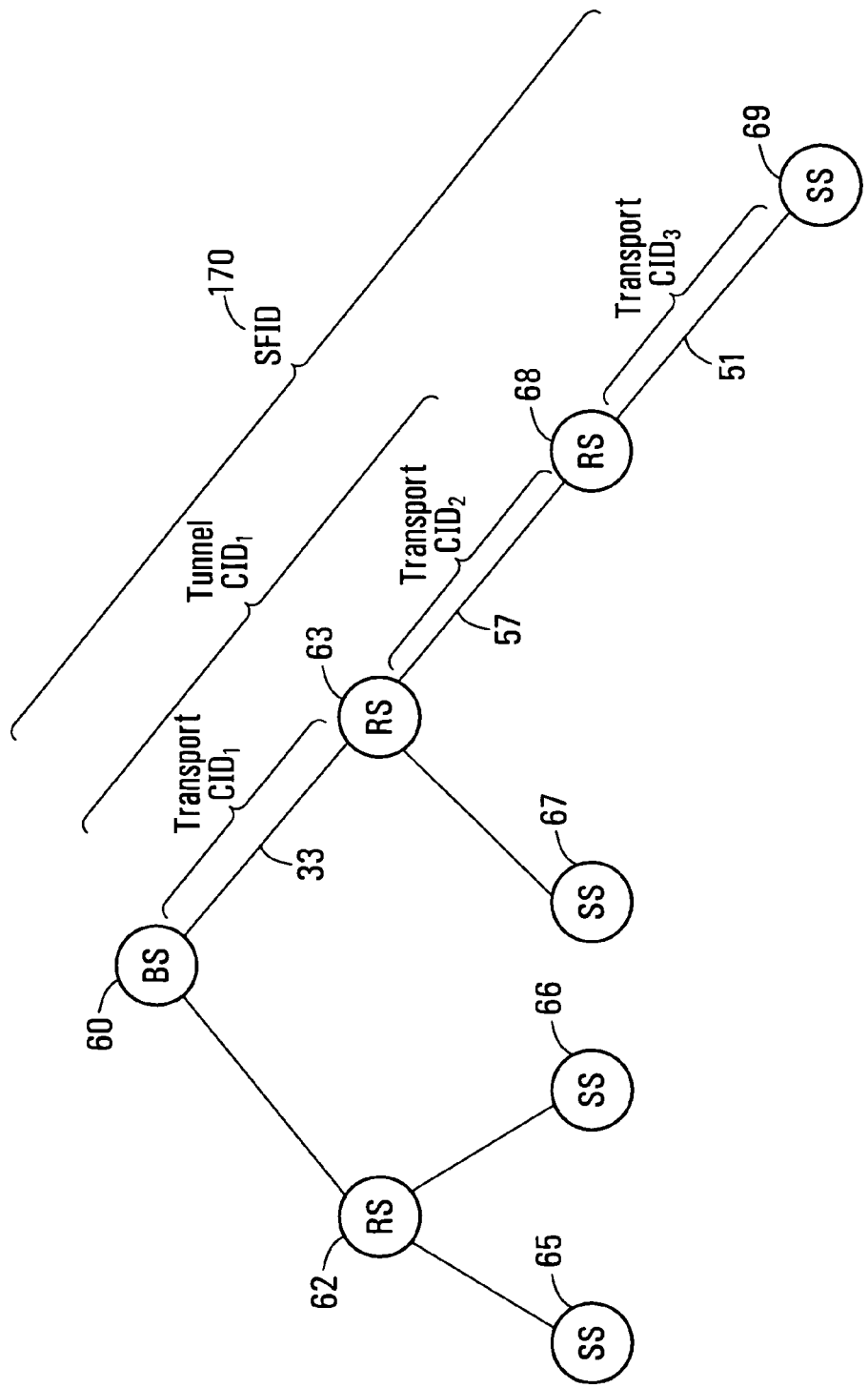
FIG. 2 is a schematic diagram of a multi-hop relay network according to an embodiment of the invention.

FIG. 2 is a schematic diagram of a very simple two-tier PMP relay network in which RS 62 and RS 63 supports PMP transmission to the attached SS and conducts relay functions between BS and SS. At the tree trunk level, BS 60 communicates with RS 62 and RS 63. RS 62 in turn communicates with SS 65 and SS 66. Similarly, RS 63 communicates with SS 67 and RS 68. RS 68 communicates with SS 69.

Through the use of a PMP multi-hop relay protocol, a payload can, for example, be delivered from BS 60 to SS 69 through RS 63 and RS 68. FIG. 2 is only one example of a PMP multi-hop relay network which can be used with the present invention. It is to be understood that the number of RS's and SS's in the network can vary from that shown in FIG. 2. The example of FIG. 2 is a tree topology, and this is assumed for the details that follow.

In 802.16, all service flows have a 32-bit service flow identifier (SFID). For example, SFID 70 is used for a service flow between BS 60 and SS 69. The SFID serves as the principal identifier in the subscriber station and the base station for the application service flow. Active service flows also have a 16-bit connection identifier (CID). A CID defines the connection between a BS and a SS that a packet is servicing.

Figure 1A:
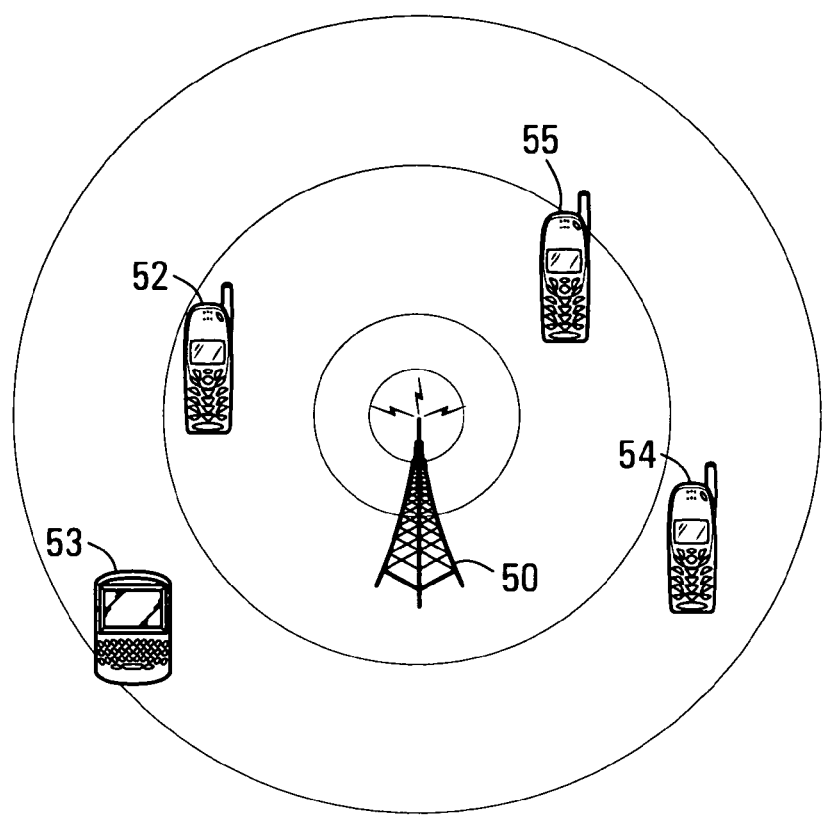
FIG. 1A is a pictorial diagram of a point-to-multi-point (PMP) network.
Figure 1B:
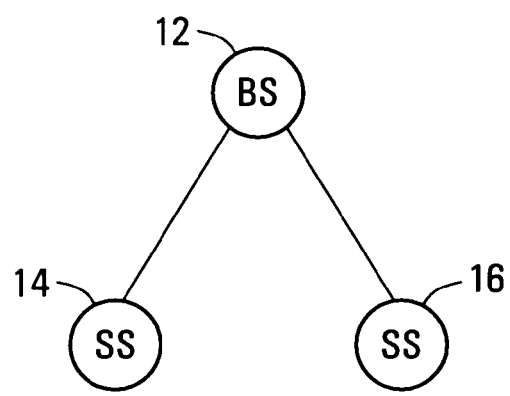
FIG. 1B is a schematic diagram of a very simple PMP network.

In conventional one-hop PMP mode (FIG. 1B), both SFID and CID are global (end to end) and as such there is a one-to-one mapping between a SFID and a CID. Thus, in a one-hop transmission between a BS and a SS, there is a one-to-one correspondence between a CID and a SFID. In accordance with a PMP multi-hop relay mode provided by an embodiment of the present invention, a SFID (such as SFID 70) is still global but the CID may only have a local sense (i.e. it is used per-air-link for unidirectional point-to-point transmissions only to the next closest hop), or may have a global sense, depending on whether radio channel resources are allocated/scheduled locally (e.g., distributed allocation) or globally (e.g., centralized allocation), or the radio allocation is done in both way collectively (e.g., hybrid allocation). A transport CID represents per-flow-based air link connectivity, while a tunnel CID represents a "pipe" from a source node to a destination node, as described in more detail below.

This is shown in the example of FIG. 2 where transport $CID_1$ represents a Connection Identification number for a service flow on link 33 between BS 60 and RS 63. Transport $CID_2$ represents a Connection Identification number for the same service flow on link 57 between RS 63 and RS 68. Transport $CID_3$ represents a transport Connection Identification number for the same service flow on link 51 between RS 68 and SS 69. The set of transport CIDs of each air link from a BS to a SS forms an end-to-end switch path.

Using the transport CIDs, BS 60 and RS 63 may schedule their air links individually, and RS 63 may conduct traffic aggregation/distribution via a CID stack. For example, in the upstream direction, RS 63 can aggregate the uplink traffic received from SS 67 and RS 68 (with different CID) into one uplink traffic stream with tunnel $CID_1$ to BS 60. In this example, tunnel $CID_1$ may have a global sense between aggregation RS 63 and BS 60 by crossing several air links. At aggregation RS 63, multiple MAC Protocol Data Units (PDUs) with different transport CIDs can be encapsulated into a generic MAC header with a tunnel CID stack, and then to be transmitted upstream to BS 60. Doing so will effectively promote efficiency of the uplink radio channel utilization.

In order to relay a traffic packet downstream from BS 60, through RS 63, to SS 68, a facility is provided in order to receive a packet in respect of transport $CID_1$ at RS 63 and then to forward the packet in respect of transport $CID_2$. Mechanisms for relaying traffic packets in this manner are detailed below. More generally, a facility is provided to relay traffic packets in this manner at any relay node. The procedure in RS 63 to change one CID (in this case, transport $CID_1$) to another CID (in this case, transport $CID_2$) is called "CID swapping".

Before traffic can be transmitted using the various transport CIDs, the path through the network, and the association of transport CIDs with respective hops needs to be established. A specific example of a mechanism for identifying paths through a network for subsequent use in combination with the CID swapping approaches taught herein is "constraint based dynamic service signalling" as found in found in applicant's corresponding U.S. patent application Ser. No. 11/481,825 filed on Jul. 7, 2006.

The CID mapping relationship from the ingress air link to the egress air link can be set up by using existing 802.16 out of band dynamic service signalling messages with some minor modifications. Detailed examples are provided below. As such, end-to-end air paths can be provided for data transmission, QoS control, traffic engineering, and potential multi-service traffic over WiMAX transport. After a CID mapping relationship has been established, CID swapping will be applied to all the received application payload traffic. Whenever a service flow or a tunnel is terminated, the correspondent CID will be released for the future re-use.

CID Switch Path Setup using Modifications to 802.16

In some embodiments, the new PMP mode is provided by way of modifications to the 802.16 protocol that might be made to carry out PMP multi-hop relaying but it is to be understood that embodiments may be provided for other contexts.

In PMP mode, the 802.16 Medium Access Control (MAC) protocol is connection oriented. Upon entering the network, each SS creates one or more connections over which their data is transmitted to and from the BS. The MAC layer schedules the usage of the airlink resources and provides Quality of Service (QoS) differentiation. It performs link adaptation and Automatic Repeat Request (ARQ) functions to maintain target Bit Error Rates (BER) while maximizing the data throughput. The MAC layer also handles network entry for SS's that enter and leave the network, and it performs standard PDU creation tasks.

Figure 3:
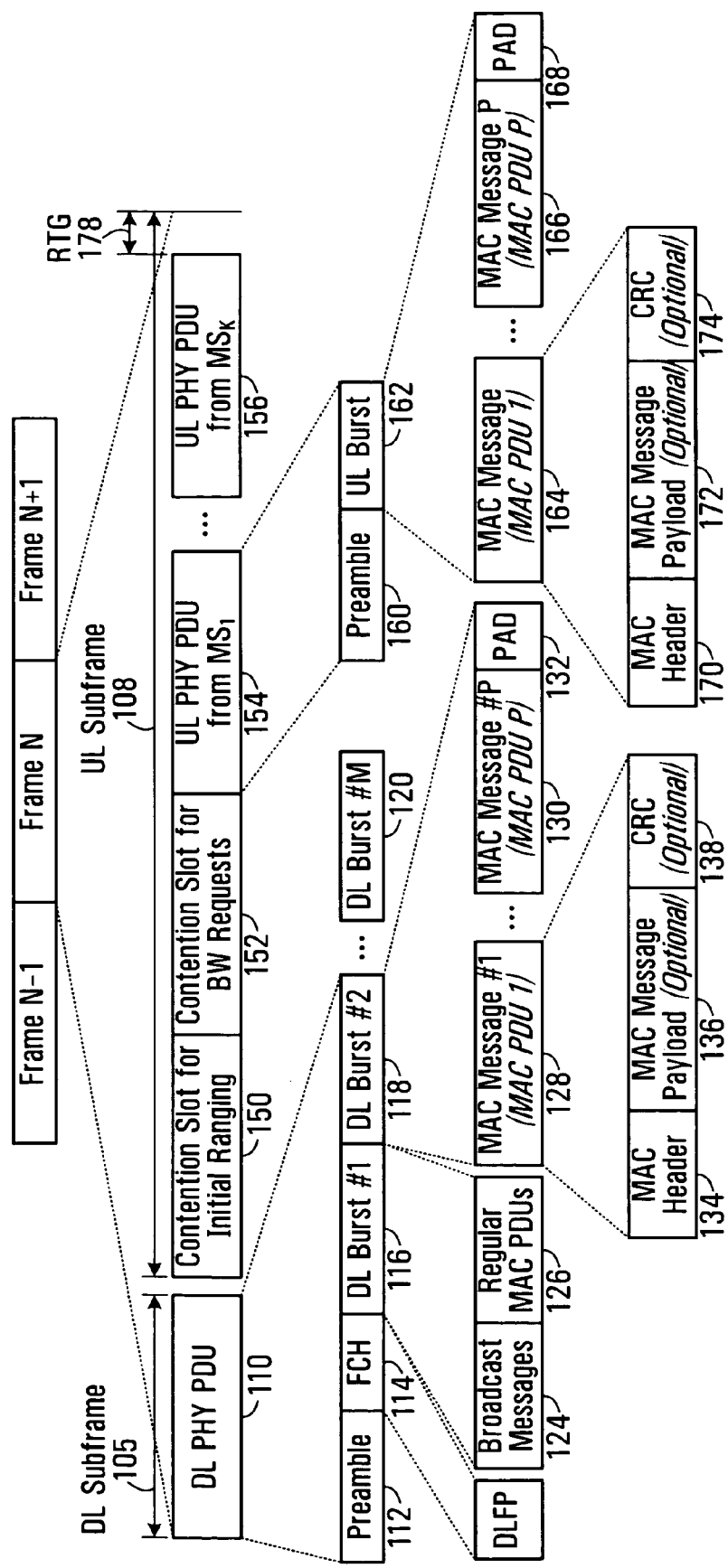
FIG. 3 is a schematic diagram of a frame used for Down link (DL) and Up link (UL) transmission in accordance with some embodiments of the invention.

FIG. 3 shows a schematic diagram of an example frame structure for time division duplex (TDD) transmission used in conjunction with embodiments of the invention. Frame N, which is preceded by Frame N−1 and followed by Frame N+1, includes a downlink (DL) subframe 105 and an uplink (UL) subframe 108. The DL subframe 105 includes a DL physical (PHY) PDU (protocol data unit) 110 that has a preamble 112, a frame control header (FCH) 114 and multiple DL bursts 116, 118, 120. A PDU is a data unit exchanged between peer entities. In some embodiments the multiple DL bursts 116, 118, 120 each have different modulation and coding. In other embodiments, some or all of the DL bursts have the same modulation and coding. A first DL burst 116 contains broadcast messages 124 to be broadcast to all RS and SS including DL MAP and UL MAP IEs (not shown). More specifically, the DL MAP is for broadcast to nodes (RS or SS) in communication with a given transmitter (BS or RS). The DL MAP contains a mapping of the time frequency resource to the content of individual receivers, typically through the use of CIDs. The DL MAP can be changed by relay stations as detailed below.

If the broadcast messages 124 do not occupy an entire allocated time duration for the first DL burst 116, Medium Access Control (MAC) PDU messages 126 directed to one or more individual SS's may fill the remainder of the time slot. In some embodiments the broadcast messages may use more than a single DL burst. However, a shorter broadcast message means that more data can be transmitted in the frame. Subsequent DL bursts 118, 120 include multiple MAC PDU messages 128, 130 directed to one or more individual SS. In some embodiments the DL bursts include padding 132. Each MAC PDU message contains a MAC header 134. The MAC PDU message may also include a MAC message payload 136 and cyclic redundancy check (CRC) 138 as shown in FIG. 3. The CRC 138 is used for error detection. The broadcast messages 124 also contains a MAC header.

The UL subframe 108 shown in FIG. 3 includes a contention slot 150 for initial ranging requests, which is a time duration for multiple SS communicating with the BS to contend for DL and/or UL resources. The UL subframe 108 also includes a contention slot 152 for bandwidth (BW) requests, which is a time duration for the multiple SS communicating with the BS to contend for additional UL resources. The UL subframe 108 also includes an UL PHY PDU 154, 156 that enables each source SS to communicate with the BS. Typically, the UL PHY PDU 154, 156 supports an UL burst 162 that is transmitted using a modulation and coding specific to the source SS. Each UL PHY PDU 154, 156 includes a preamble 160 and the UL burst 162. The UL burst 162 includes multiple MAC PDU messages 164,166. In some embodiments the UL burst 162 includes padding 168. Each MAC PDU message 164,166 contains a MAC header 170. The MAC PDU message 164,166 may also include a MAC message payload 172 and CRC 174. Following the UL subframe 108 is a receive/transmit transition guard (RTG) 178. Frames N−1 and N+1 have a similar composition.

FIG. 3 is an example frame that can be used in accordance with the invention. In some embodiments the frame may not include all the described components of FIG. 3, for example a frame may not include both described contention slots 150, 152, or may include additional slots to allow contending for other reasons. Furthermore, a frame may have other additional guard slots such as a transmit/receive transition guard (TTG) located between the DL subframe 105 and UL subframe 108. The frame of FIG. 3 is consistent with the frame established for IEEE 802.16. However, the use of other frame structures may be considered within the scope of the invention if capable of supporting the PMP multi-hop relay protocols as described herein.

Frames enabling frequency division duplex (FDD) communication and combined TDD/FDD communication are also both considered to be within the scope of the invention.

As described above, MAC PDUs include MAC headers. MAC PDUs can be used to transmit data or MAC messages. There are two common forms of MAC header, a generic MAC header and a bandwidth request MAC header. There may also be one or more sub-headers defined for a MAC header.

Figure 4A:
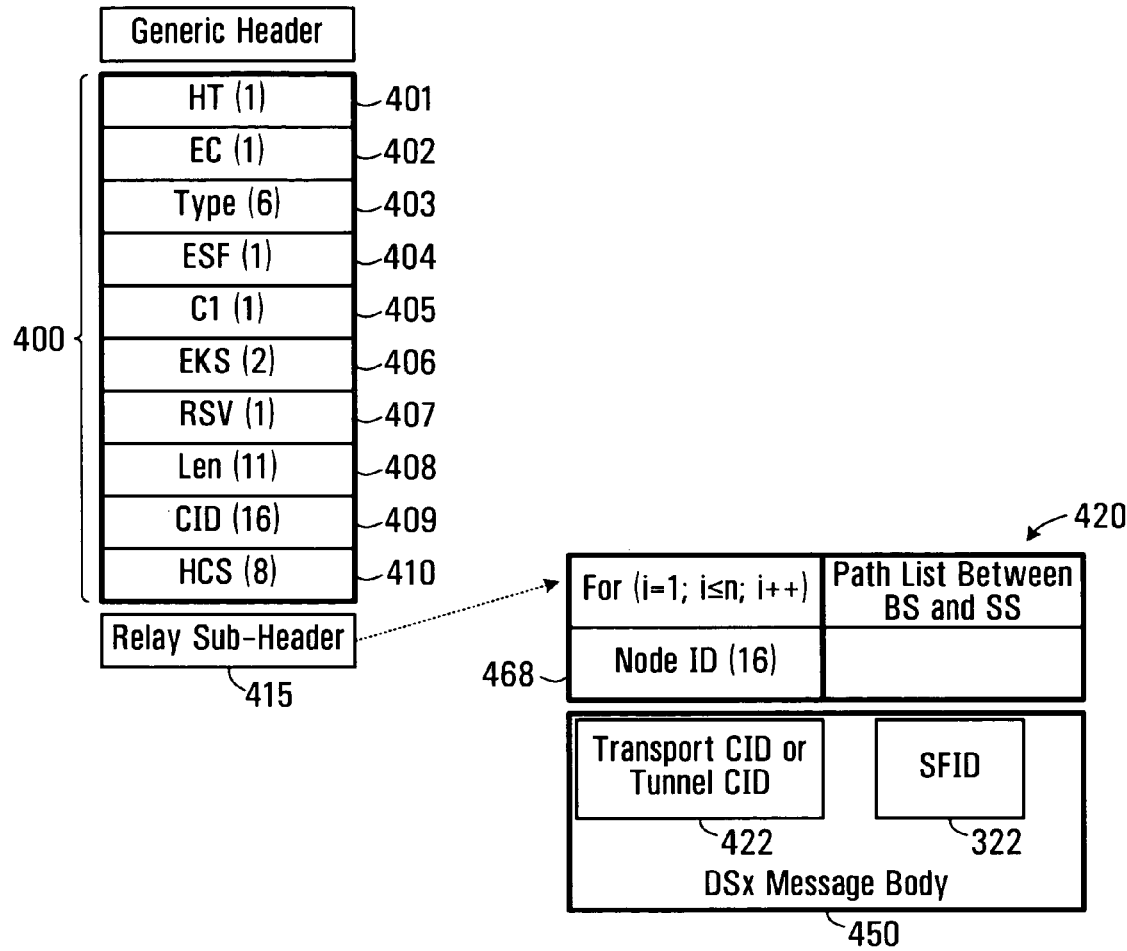
FIG. 4A is a schematic diagram of a Medium Access Control (MAC) header and relay sub-header used during the messaging setup phase of some embodiments of the invention.

The fields of a generic MAC header (see MAC header 134 in FIG. 3) specially adapted to allow the setting up of paths through a network based on CID are illustrated in FIG. 4A and are collectively indicated at 400. The numbers in brackets in each field indicate a number of bytes in the field.

Generic MAC header 400 includes a "Header Type (HT)" field 401, an "Encryption Control (EC)" field 402, a "Type" field 403, an Extended Sub-header "ESF" field 404, a "CRC indicator (CI)" field 405, an "encryption key sequence (EKS)" field 406, a "RSV" field 407, a "Length (Len)" field 408, a "CID" field 409 and a "Header Check Sequence (HCS)" field 410. "HT" field 401 indicates the type of header. "Type" field 403 indicates sub-headers and special payload types present in the message payload. The "RSV" fields 404, 407 are reserved for variable use, which allows flexibility in the use of these fields. "Len" field 408 is the length in bytes of the MAC PDU including the MAC header and the CRC if present.

The CID field 409 in the generic MAC header 400 includes either a management CID for 802.16 system management messages or a transport CID for application traffic flow. "ESF" field 404 indicates extended sub-header format which relates to the existence of a sub-header group which can define up to 128 types of extended sub-headers. In accordance with one embodiment, sub-header 415 entitled "Relay sub-header" is defined which may optionally include a node ID list 420. Node ID list 420 is a path list comprising a set of all the Node IDs along the selected path between a BS and a SS.

In 802.16, dynamic service flows may be created, changed, or deleted, which is accomplished through a series of MAC management messages known as dynamic service addition (DSA) for creating a new service flow, dynamic service change (DSC) for changing an existing flow, and dynamic service deletion (DSD) for deleting an existing service flow. Generically, these are referred to as DSx messages.

In DSx message body 450, there is a field containing a transport CID associated with a given service flow (as defined in 802.16-2005). In multi-hop relay, this field 422 is extended to contain either a transport CID (per airlink based), or a tunnel CID (per subordinate tree section based), based on the type of destination node (RS or SS). If field 422 holds a transport CID, that CID would be associated with a given service flow at a path end point and at each air link interface. If field 422 holds a tunnel CID, that CID would be associated with a segmentation of relay path from BS to a RS/SS. With this approach, a transport CID in field 422 represents perflow-based air link connectivity, while, as noted above, a tunnel CID in field 422 represents a "pipe" which is used for traffic engineering, traffic security and traffic aggregation purposes.

DSx message body 450 also contains SFID 322. SFID 322 is used to identify a service flow between a BS and a SS.

In a particular implementation, MAC messages are either MAC management messages, or MAC payload messages. A DSx message with relay sub-header 415 containing a path list 420 is an example of a MAC management message that can be used to distribute CIDs along a given path. MAC management messages use path list 420 in relay sub-header 415 to build up an end-to-end CID path, while MAC payload message may use allocated transport CIDs in generic header 400 or tunnel CID 422 in relay sub-header 415 to navigate the data transmission.

Generally, in order to set up a path through the network, a DSx message containing an initial transport CID (or tunnel CID as the case may be) in field 422, and containing path list 420 in relay sub-header 415 is generated and transmitted along the path on the basis of path list 420. Each intermediate node receives the DSx message, and replaces the transport CID (or tunnel CID as the case may be) in field 422 with a transport CID (or tunnel CID as the case may be) for the next hop. Each intermediate node also establishes a mapping between the transport CID (or tunnel CID as the case may be) that was received and the transport CID (or tunnel CID as the case may be) that was transmitted. This mapping is used for forwarding traffic packets as detailed below.

Figure 4B:
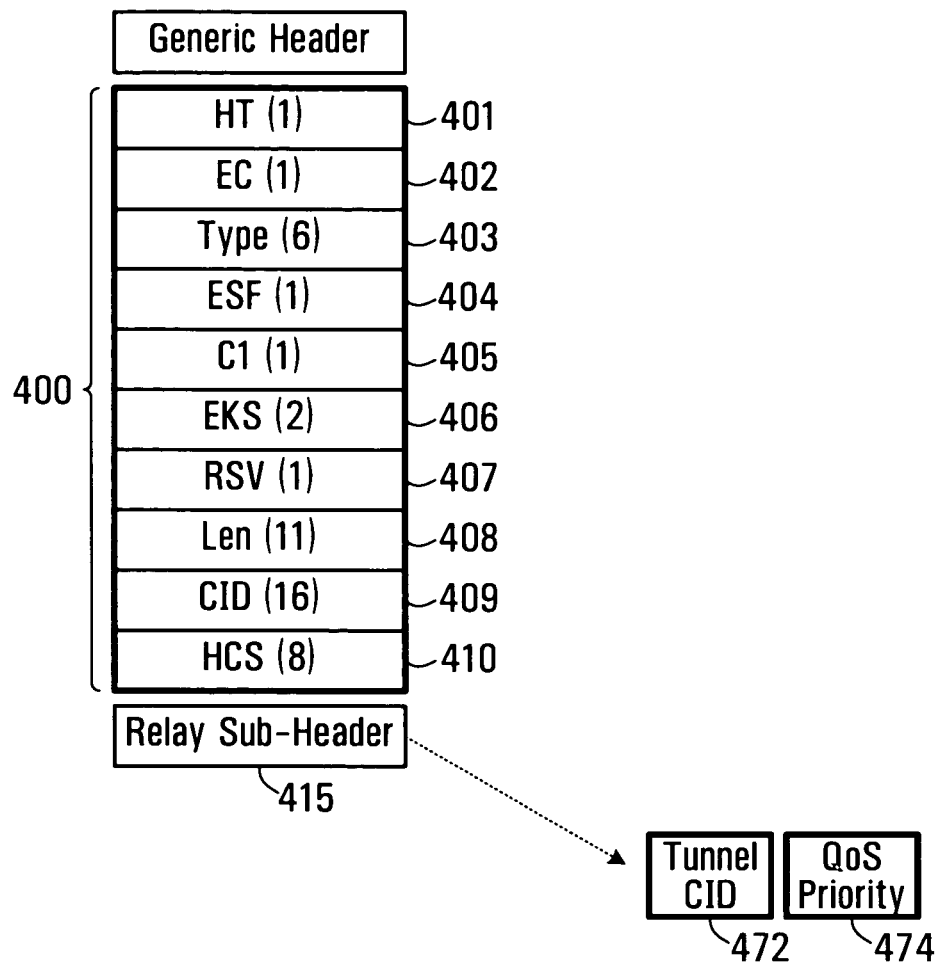
FIG. 4B is a schematic diagram of a Medium Access Control (MAC) header and relay sub-header used during the traffic phase of some embodiments of the invention.

FIG. 4B is a schematic diagram of a Medium Access Control (MAC) header and relay sub-header used during the traffic phase of some embodiments of the invention. The description of elements already described in connection with FIG. 4A will not be repeated.

After the CID path has been established, the normal MAC payload PDU for the service flow can have transport CID 409 in its generic header and optionally have tunnel CID 472 and Quality of Service (QoS) priority field 474 in relay sub-header 415. QoS priority field 474 is a parameter which provides QoS differentiation. Based on those CIDs, each RS along the give path would conduct CID swapping to relay the user traffic between BS and SS, and handle QoS processing based on QoS priority 474.

FIGS. 4A and 4B are two examples of a generic MAC header that those skilled in the art may be familiar with according to IEEE 802.15. In some embodiments there may be a greater or lesser number of fields in each of generic MAC header 400 and relay sub-header 415 than are shown in FIGS. 4A and 4B. Furthermore, the header fields may have a different number of bytes than indicated in FIGS. 4A and 4B. More generally, it is to be understood that a MAC header having a different layout but performing substantially the same task could be used in conjunction with relay sub-header 415.

Decoupling of Data and Control

In some embodiments, having established the CID path as described above, the processing of traffic packets within the data plane is done without involvement of the control plane. The control plane and data plane may be implemented with separate processors/hardware/software or on a single processor/hardware software.

Figure 5:
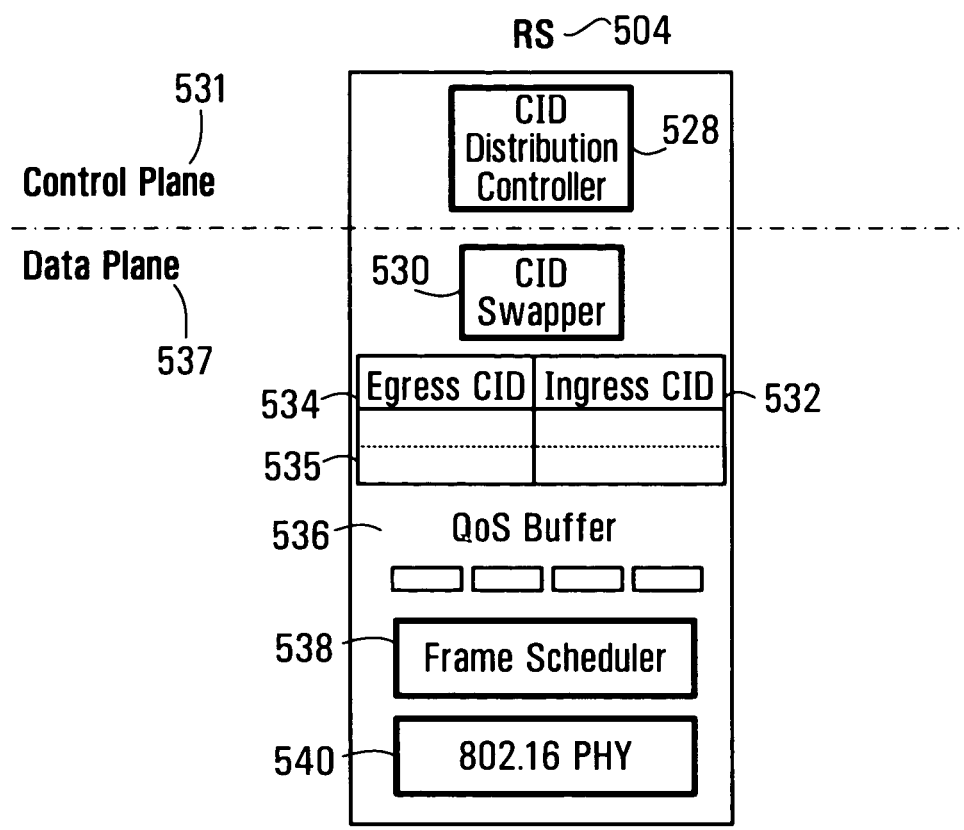
FIG. 5 is a schematic diagram of control/data plane decoupling for a relay station used during the messaging setup phase in accordance with some embodiments of the invention.

FIG. 5 is a schematic diagram of control/data plane decoupling for a relay station 504 used in accordance with some embodiments of the invention. The control plane functionality 531 is shown to comprise a CID distribution controller 528. The data plane functionality 537 is comprised of CID swapper 530, CID mapping table 535 containing egress CID 534 and its corresponding ingress CID 532. The nature of the correspondence between egress CID 534 and ingress CID 532 will be described below. There is also a set of QOS buffers 536 which represents the queuing of packets according to QoS for delivery by the frame scheduler 538 by means of the 802.16 physical layer 540.

An example of the operation of the messaging setup phase of PMP multi-hop relay is as follows. CID distribution controller 528 receives, from another station, a DSx message which contains an ingress CID. CID distribution controller 528 also received a path list of Node IDs from the source station to the destination station. CID distribution controller 528 then uses the Node ID for the next station to allocate egress CID 534 for the connection to that next station. CID distribution controller 528 also creates entries in CID mapping table 535 for ingress CID 532 and the newly allocated egress CID 534. Finally, CID distribution controller 528 reserves air link bandwidth for the next connection against the associated QoS parameters. CID distribution controller then replaces the ingress CID in the DSx message with egress CID 534. The DSx message is then queued for delivery through QoS buffer 536 by frame scheduler 538 by means of 802.16 physical layer 540. Based on the destination information embedded in the path list contained in the DSx message sub-header and the service flow ID in DSx message body, RS 504 can identify the CID mapping table entry as being either a transport CID mapping or a tunnel CID mapping.

Of course, since any of the air links in communication with RS 504 may include multiple service flows (and therefore multiple CIDs), CID mapping table 535 may include multiple rows for multiple ingress CIDs and their corresponding egress CIDs.

As will be in explained in more detail below, once there are corresponding ingress and egress CIDs in each CID mapping table in each relay station between a source node and a destination node, the messaging setup phase will be concluded. Traffic between the source code and the destination node will then be routed without further need for the involvement of CID distribution controller 528. For each received MAC payload message, CID swapper 530 will take out transport CID 409 from MAC PDU generic header (or tunnel CID 422 from relay sub-header 415 as the case may be), then look up CID mapping table 535, find the corresponding egress CID, swap the CID, and further transmit the MAC payload PDU to the next hop. Thus, there is a decoupling of the control plane from the data plane. Due to multi-tier PMP node in the multi-hop relay network, each frame is broadcast to all the downstream nodes. Each intermediate node will simply drop the MAC PDU if CID swapper 530 cannot find any entry in CID mapping table 535 (which means the MAC PDU received is not targeted to the RS' subordinate tree).

In some embodiments, both CID distribution controller 528 and CID swapper 530 may collaborate with handoff control functions to provide fast re-route for mobility.

Specific mechanisms of data plane processing are detailed below.

Figure 6:
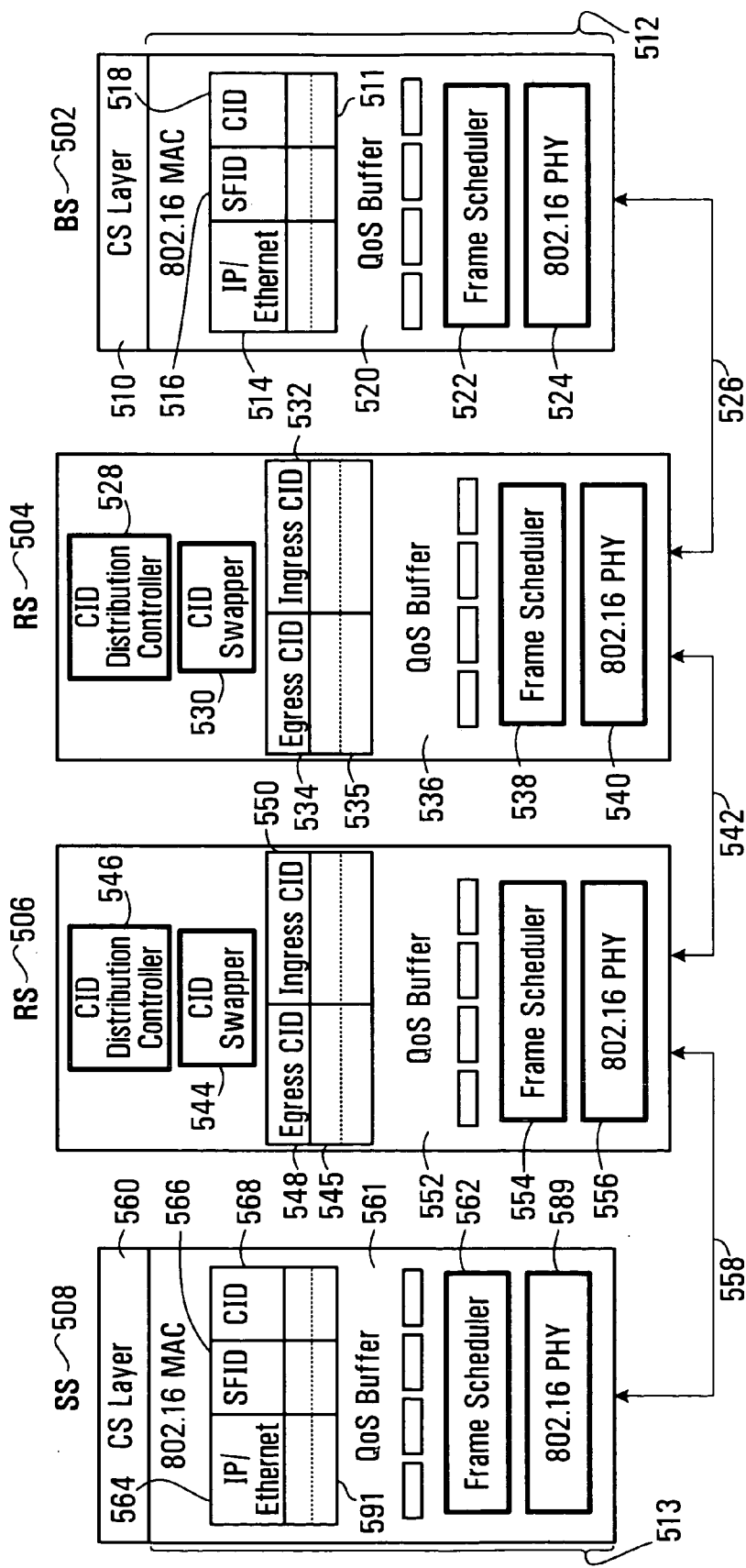
FIG. 6 is a schematic diagram illustrating MAC layer CID processing for multi-hop relay.

FIG. 6 is a diagram illustrating end-to-end MAC layer CID processing for a PMP multi-hop relay scenario over three hops. Shown is BS 502 which is in communication with RS 504 via air link 526, RS 504 which is in communication with RS 506 via air link 542, and RS 506 which is in communication with SS 508 via air link 558.

In BS 502, the 802.16 protocol is represented by Convergence Layer 510 (CS) and MAC layer 512. MAC layer 512 is comprised of CID mapping table 511 mapping IP/Ethernet data flow 514, to SFID 516 to CID 518. Contained within MAC layer 512 are QoS buffers 520 which represents the queuing of packets according to QoS for delivery by the frame scheduler 522 by means of the 802.16 physical layer 524.

RS 504 is the same as was shown and described in FIG. 5. RS 506 is the same as RS 504 and as a result, CID swapper 544, CID distribution controller 546, CID mapping table 545, egress CID 548, ingress CID 550, QoS buffer 552, frame scheduler 554 and 802.16 PHY will not be further described.

In SS 508, the 802.16 protocol is represented by Convergence Layer 560 (CS) and MAC layer 513. MAC layer 513 is comprised of CID mapping table 591 mapping IP/Ethernet 564, to SFID 566 to CID 568. Contained within MAC layer 512 is QOS buffer 561 which represents the queuing of packets for delivery according to QoS by the frame scheduler 562 by means of the 802.16 physical layer 589.

An embodiment of the set-up phase of PMP multi-hop relay is as follows. The MAC header (see MAC header 400 in FIG. 4) and relay sub-header (see relay sub-header 415 in FIG. 4) contains a path list of Node IDs for BS 502, RS 504, RS 506 and SS 508 which are transmitted along with a Dynamic Service Message (DSx) containing a transport CID for the connection between BS 502 and RS 504 across air link 526 to RS 504. The path list in the relay sub-header is used to pilot the packet along the path from source node to destination node.

At RS 504, an ingress CID 532 for the connection between BS 502 and RS 504 is received at CID distribution controller 530. CID distribution controller 530 then creates an entry in CID mapping table 535 for ingress CID 532. The path list in the relay sub-header is also received by CID distribution controller 530 containing the Node ID of RS 506 which is the next hop along the transmission path. CID distribution controller 530 then allocates a CID for the next connection along the path from the source node to the destination node, i.e. from RS 504 to RS 506. This is referred to as egress CID 534 which is then written into table 535 such that ingress CID 532 and egress CID 534 correspond with each other. CID distribution controller 528 then replaces the ingress CID 532 for the egress CID 534 in DSx message 470. The MAC header, relay sub-header and DSx message are then forwarded to QOS buffer 536 and frame scheduler 538, and then transmitted on air link 542 to the next hop (in this case RS 506) by means of the 802.16 physical layer 540.

At RS 506, all of the same functions are carried out on the MAC header, relay sub-header and DSx message as were carried out by RS 504. At RS 506, egress CID 534 which is a CID for the connection between RS 504 and RS 506 is received at CID distribution controller 546. On receipt, egress CID 534 will be referred to as ingress CID 548. CID distribution controller 546 then creates an entry in table 545 for ingress CID 548. The path list in the Relay sub-header is also received by CID distribution controller 546 containing the Node ID of SS 508 which is the next hop along the transmission path. CID distribution controller 546 then allocates a CID for the next connection along the path from the source node to the destination node, i.e. from RS 506 to SS 508. This is referred to as egress CID 550 which is then written into table 545 such that ingress CID 530 and egress CID 548 correspond with each other. CID distribution controller 544 then replaces the ingress CID 545 for the egress CID 550 in DSx message 470. The MAC header, relay sub-header and DSx message are then forwarded to QOS buffer 552 and frame scheduler 554, and then transmitted on air link 558 to the next hop (in this case SS 508) by means of the 802.16 physical layer 556.

At SS 508, the destination station is reached. At this point, the messaging setup phase is concluded because the destination node has been reached and there are corresponding ingress and egress CIDs stored in each CID mapping table in each relay station between BS 502 and SS 508. Message traffic between BS 502 and RS 508 will then be routed via RS 504 and RS 506 without further need for CID distribution controller 528, 546. CID swapper 530, 544 will use CID mapping tables 535, 545 to map the correspondence between ingress CIDs and egress CIDs along the pathway between BS 502 and RS 508, and vice versa (i.e. both uplink and downlink message traffic).

Note that the above description applies generally to the case where ingress CIDs and egress CIDs are transport CIDs. The same description also applies in the case of tunnel CIDs, though in this case an ingress CID and its corresponding egress CID in a CID mapping table may be the same.

Network layer operation involvement is not required for the message traffic phase.

Figure 7:
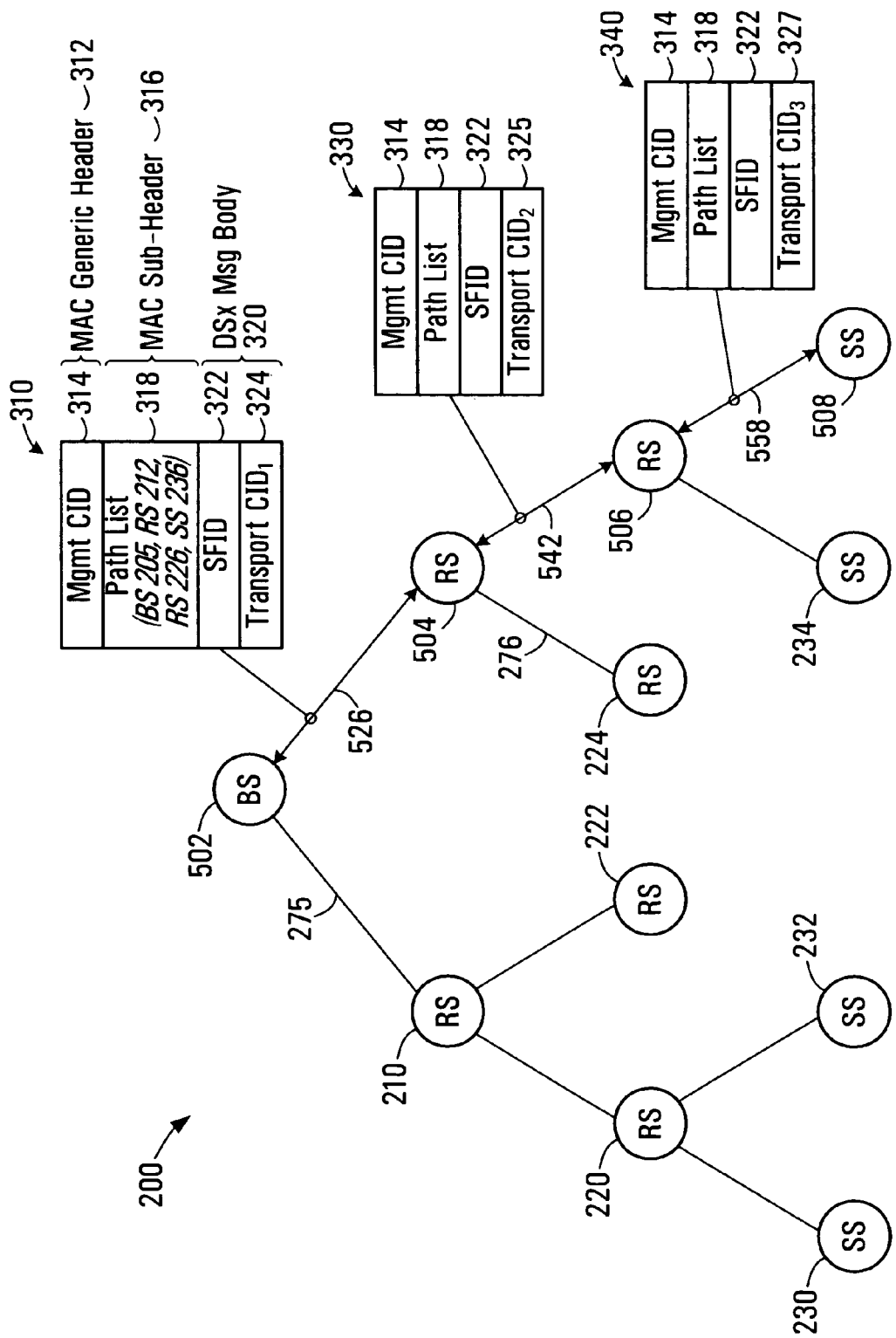
FIG. 7 is a schematic diagram of a multi-level relay network illustrating an embodiment of the messaging setup phase of the invention.

FIG. 7 is a schematic diagram of network 200 within which BS 502, RS 504, RS 506 and SS 508 detailed above with reference to FIG. 6 may be situated, with details concerning the transmission over air links 526, 542, 558 of DSx signalling messages 310, 330, and 340 during the messaging setup phase of PMP multi-hop relay. RS's 210, 220, 222, and 224, and SS 230, 232, 234 are not involved in the example described below and are included for illustration purposes only.

DSx signalling message 310 includes a DSx generic header 312 containing a Management CID 314, a Relay sub-header 316 containing a path list 318 (in this case, Node IDs identifying the route between BS 502 and SS 508 as BS 502 ⇒ RS 504 ⇒ RS 506 ⇒ SS 508) and a DSx message body 320 containing SFID 322 and Transport $CID_1$ 324. Transport $CID_1$ defines a connection on air link 526 as the route between BS 502 and RS 504.

DSx signalling message 310 is sent by BS 502 to RS 504 where it is received. Based on path list 318, RS 504 determines that signalling message 310 should be forwarded on to RS 506. Transport $CID_2$ 325 is then allocated to define a connection on air link 372 as the route between RS 506 and RS 508. In DSx message body 320, Transport $CID_1$ 324 is swapped out and replaced with Transport $CID_2$ 325. DSx signalling message 330 containing Transport $CID_2$ 325 is then sent to RS 506.

RS 506 receives DSx signalling message 330 and based on path list 318 determines that signalling message 330 should be forwarded on to SS 508. Transport $CID_3$ 327 is then generated to define connection 374 as the route between RS 506 and SS 508. In DSx message body 320, Transport $CID_2$ 325 is swapped out and replaced with Transport $CID_3$ 327. Signalling message 340 is then relayed on to SS 508 which is the destination node for the packet.

Note that DSx signalling messages 310, 330 and 340 may include tunnel CIDs in the place of transport CIDs in DSx message body 320. In this case, the CID mapping tables contained within RS 504 and RS 506 would contain correspondences between tunnel CIDs instead of transport CIDs. It is also noted that an end-to-end transport CID path and an end-to-end tunnel CID path would be created using separate DSx messages as they have different destinations.

Traffic Processing—DL MAP Implementation

The traffic phase of PMP multi-hop relay functionality will now be described. In one embodiment of the traffic phase of PMP multi-hop relay, a DL MAP (downlink multiplexing access profile) is broadcast by the base station in each downlink frame. The DL MAP associates a respective Orthogonal Frequency-Division Multiplexing (OFDM) time frequency resource, related coding schema, the position of data burst with each CID to be given resources during a given scheduling interval. Each individual receiver uses the MAP together with knowledge of which CID is theirs to determine where their data burst content will be positioned within the received OFDM downlink frame and what coding method should be used to decode OFDM symbols. In a DL, subchannels may be intended for different receivers. In each OFDM DL frame, a data burst can contain multiple MAC PDUs. In DL-MAP, CIDs are used to indicate which data burst is to be designated to which SS. An individual receiver distinguishes data destined for it by means of a CID. Depending on service flow characteristics, this CID could be broadcast, multicast, unicast, or null.

For this embodiment, the CID used in DL-MAP could be a tunnel CID (i.e. a CID stack) for downstream traffic delivery. CID swapping for traffic involves each intermediate node receiving the DL MAP, and swapping out the ingress CID for the egress CID in the MAP. Note that the frequency time resource assigned to the egress CID may differ from that assigned to the ingress CID. Thus, the intermediate node also moves the burst for each CID from its ingress frequency time resource assignment to its egress frequency time resource assignment.

Figure 8A:
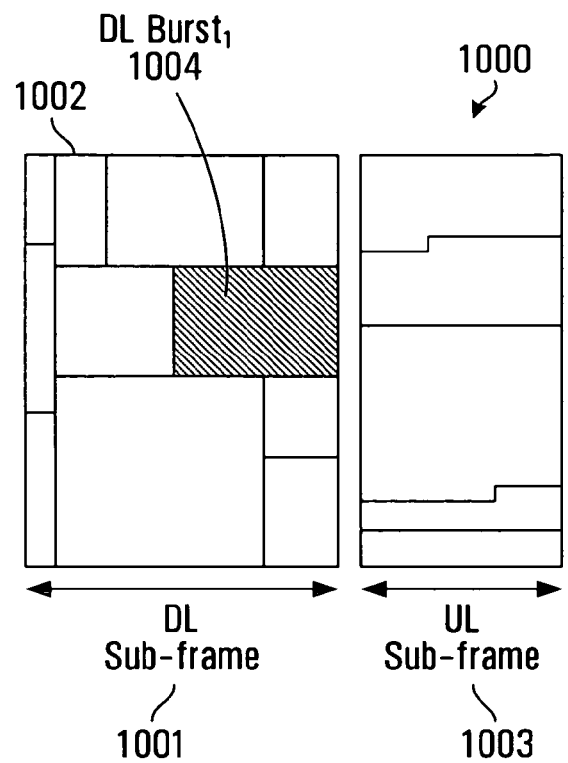
FIG. 8A is a schematic diagram of an OFDMA frame as received by a relay station during the traffic phase in accordance with some embodiments of the invention.
Figure 8B:
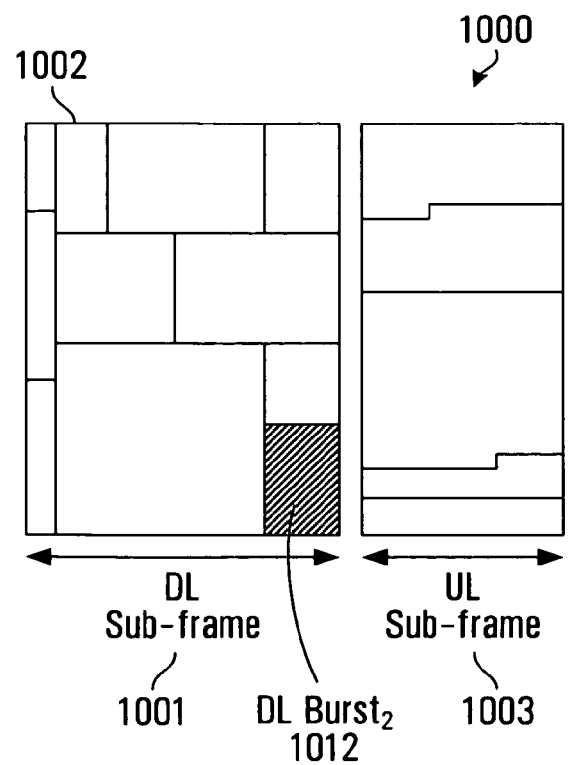
FIG. 8B is a schematic diagram of an OFDMA frame after CID swapping during the traffic phase in accordance with some embodiments of the invention.

Referring now to FIGS. 8A and 8B a specific example of how CID swapping for traffic can be handled by an intermediate node. FIG. 8A shows an example frame structure transmitted by a first node, for this example assumed to be BS 502 of FIG. 7, while FIG. 8B shows an example frame structure transmitted by a subsequent relay station, for this example assumed to be RS 504 of FIG. 7. OFDMA frame 1000 contains DL sub-frame 1001 and UL sub-frame 1003. For simplification purposes, further details regarding the OFDMA frame are not shown or described. Contained within DL sub-frame 1001 is DL-burst$_1$ 1004 which is a DL burst intended for reception by SS 508. Also contained within DL sub-frame 1001 is DL-MAP 1002 which contains information regarding how OFDMA frame 1000 as a whole will be used. For example, DL-MAP 1002 might contain $CID_1$ which is the CID for the connection between BS 502 205 and RS 504 of FIG. 7. DL-MAP 1002 also contains information which maps $CID_1$ to DL Burst$_1$.

As described in detail above, after the messaging setup phase is complete, RS 504 contains a CID swapping table with an entry for $CID_1$. (See, for example, CID swapping table 535 in FIG. 6). RS 504 will retrieve $CID_1$ contained in DL MAP 1002 and use it as an index to check the CID swapping table for an ingress CID which matches $CID_1$. Once this is found, the corresponding egress CID (hereinafter referred to as $CID_2$) will be retrieved from the CID swapping table. RS 504 will then swap $CID_1$ with $CID_2$ and generate a new DL-MAP using $CID_2$.

FIG. 8B is a schematic diagram of an OFDMA frame after CID swapping is performed by RS 504. In this case, contained within DL sub-frame 1001 is DL-burst$_2$ 1012 which is a DL burst intended for reception by RS 506. Also contained within DL sub-frame 1001 is DL-MAP 1002 which contains $CID_2$, as well as information pertaining to a mapping between $CID_2$ and DL Burst$_2$ 1012.

CID swapping similar to that described above occurs at each relay node between BS 502 and SS 508, including RS 506, until SS 508 is reached. In this embodiment, the relay node would not decode the data bursts; therefore the transport CID contained in the MAC-PDU header is untouched.

Traffic Processing—Per-Packet CID Swapping Implementation

In another embodiment of the traffic phase of PMP multi-hop relay, in the case of DL-MAP contains a null CID for a particular data burst, there is no CID contained in DL MAP 1002 of FIG. 8A. Instead, each DL Burst (such as DL Burst1 1004) contains MAC PDUs with assigned CIDs. Where a CID is not specified in DL-MAP 1002, then each intermediate node between a BS and a SS has to decode each burst (which are composed of several MAC-PDUS) and the MAC-PDUs inside that burst. In this embodiment of the traffic phase, CID swapping will be done for each MAC-PDU.

Figure 9A:
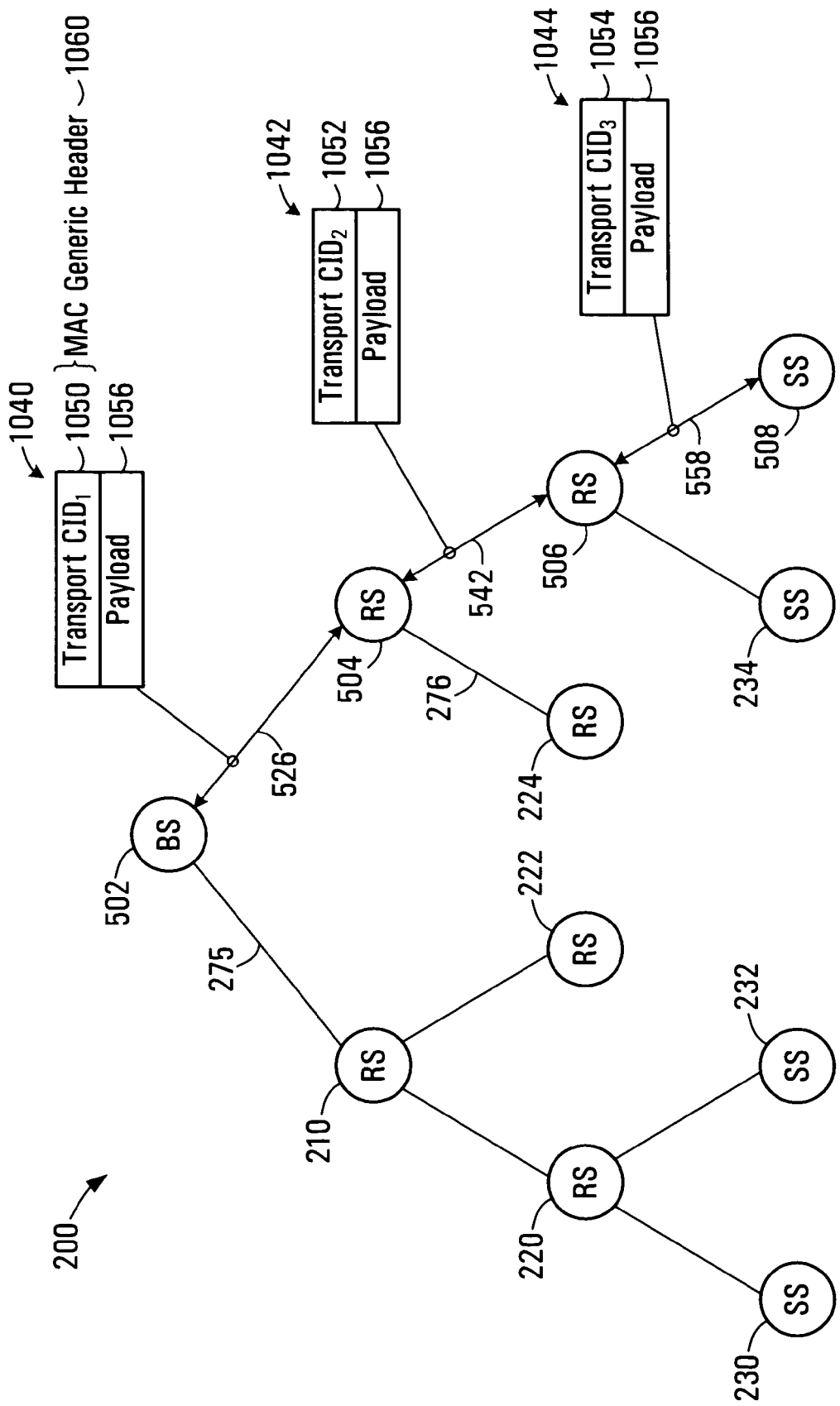
FIG. 9A is a schematic diagram of a multi-level relay network illustrating in the traffic phase in accordance with some embodiments of the invention where there is no tunnel CID.

FIG. 9A is a schematic diagram of network 200, which for this embodiment is used to illustrate the traffic phase of PMP multi-hop relay where per packet CID swapping is performed and where there is no tunnel CID. FIG. 9A illustrates the same network 200 as shown in FIG. 7. The description of elements already described in connection with FIG. 7 will not be repeated.

MAC PDU 1040 is a packet sent by BS 502 which is destined for SS 508 via RS 504 and RS 506. MAC PDU 1040 contains MAC generic header 1060 and payload 1056. MAC generic header 1050 contains transport $CID_1$. Transport $CID_1$ defines connection 370 as the route between BS 502 and RS 504.

RS 504 then receives MAC PDU 1040. As described in detail above, after the messaging setup phase is complete, RS 504 contains a CID swapping table with an entry for transport $CID_1$. (See, for example, CID swapping table 535 in FIG. 6). RS 504 will retrieve transport $CID_1$ contained in MAC PDU 1040 and use it as an index to check the CID swapping table for an ingress CID which matches transport $CID_1$. Once this is found, the corresponding egress CID (hereinafter referred to as transport $CID_2$) will be retrieved from the CID swapping table. RS 504 will then swap transport $CID_1$ with transport CID2 and generate new MAC PDU 1042 using transport $CID_2$ 1052. There may also be a relocation of the packet within the OFDM frequency time space. Note that some data bursts may be dropped by the relay node if they are not targeted to the RS's subordinate tree.

RS 506 then receives MAC PDU 1042. As explained above, RS 506 contains a CID swapping table with an entry for transport $CID_2$. RS 506 will retrieve transport $CID_2$ contained in MAC PDU 1042 and use it as an index to check the CID swapping table for an ingress CID which matches transport $CID_2$. Once this is found, the corresponding egress CID (hereinafter referred to as transport $CID_3$) will be retrieved from the CID swapping table. RS 206 will then swap transport $CID_2$ with transport $CID_3$ and generate new MAC PDU 1044 using transport $CID_3$ which will be forwarded to the packet's intended destination, SS 208.

Figure 9B:
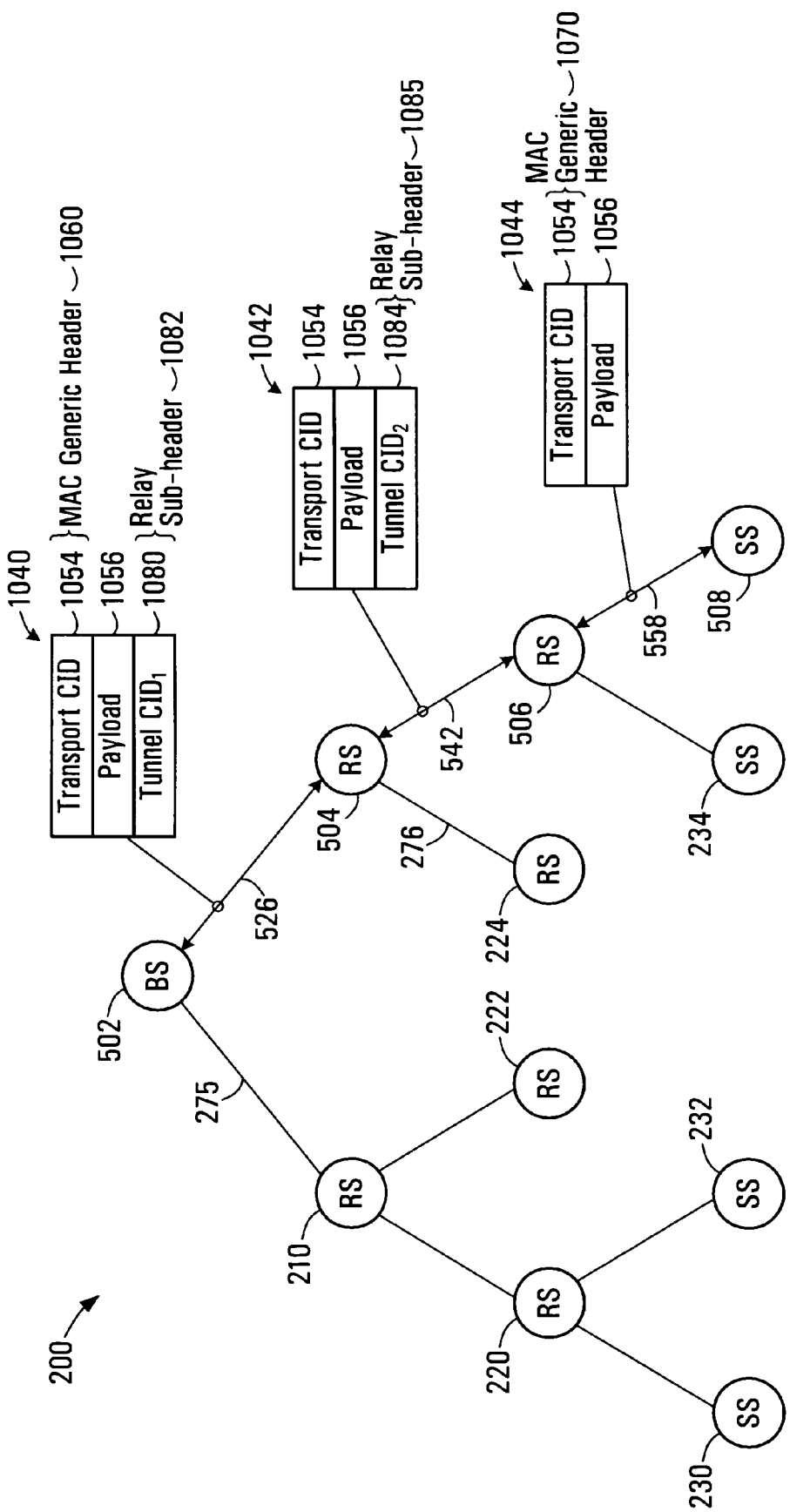
FIG. 9B is a schematic diagram of a multi-level relay network illustrating in the traffic phase in accordance with some embodiments of the invention where there is a tunnel CID.

FIG. 9B is a schematic diagram of a multi-level relay network illustrating in the traffic phase where there is a tunnel CID. Note that MAC PDUs 1040, 1042, and 1044 may optionally include a relay sub-header 1082 including a tunnel CID. For per-flow relay, if a tunnel CID is included within relay sub-header 1082, then a RS will swap the tunnel CID in the relay sub-header leaving the transport CID untouched.

FIG. 9B illustrates the same network 200 as shown in FIG. 9A. The description of elements already described in connection with FIG. 9A will not be repeated. MAC PDU 1044 is a packet sent by SS 508 which is destined for BS 502 via RS 506 and RS 504. MAC PDU 1044 contains MAC generic header 1070 and payload 1056. MAC generic header 1070 contains a transport CID 1054.

RS 506 then receives MAC PDU 1044. As described in detail above, after the messaging setup phase is complete, RS 506 contains a CID swapping table with an entry for tunnel $CID_2$ 1084 (See, for example, CID swapping table 545 in FIG. 6). Assuming RS 506 has been configured to conduct traffic aggregation for upstream traffic, RS 506 will create relay sub-header 1085 for tunnel $CID_2$ 1084, attaches sub-header 1085 into received MAC PDU 1044 (hereinafter referred to as MAC PDU 1042) and further forward the new MAC PDU 1042 upward.

RS 504 then receives MAC PDU 1042. As already explained, RS 504 contains a CID swapping table with an entry for tunnel $CID_2$ 1084. RS 504 will retrieve tunnel $CID_2$ 1084 contained in relay sub-header 1085 and use it as an index to check the CID swapping table for an ingress CID which matches tunnel $CID_2$ 1084. Once this is found, the corresponding egress CID (hereinafter referred to as tunnel $CID_1$ 1080) will be retrieved from the CID swapping table. RS 504 will then swap tunnel $CID_2$ 1084 with tunnel $CID_1$ 1080 and generate new relay sub-header 1082 using tunnel $CID_1$ 1080 in MAC PDU 1042 (hereinafter referred to as MAC PDU 1040), and then MAC PDU 1040 will be forwarded to the packet's intended destination, BS 502. Note that in RS 504, the transport CID 1054 is untouched.

When BS 502 receives MAC PDU 1040, it takes out transport CID 1054 as index and looks up the mapping table to find out correspondent SFID, and executes service convergence layer functions to transform MAC PDU to service flow packets (i.e., IP/Ethernet).

Figure 10:
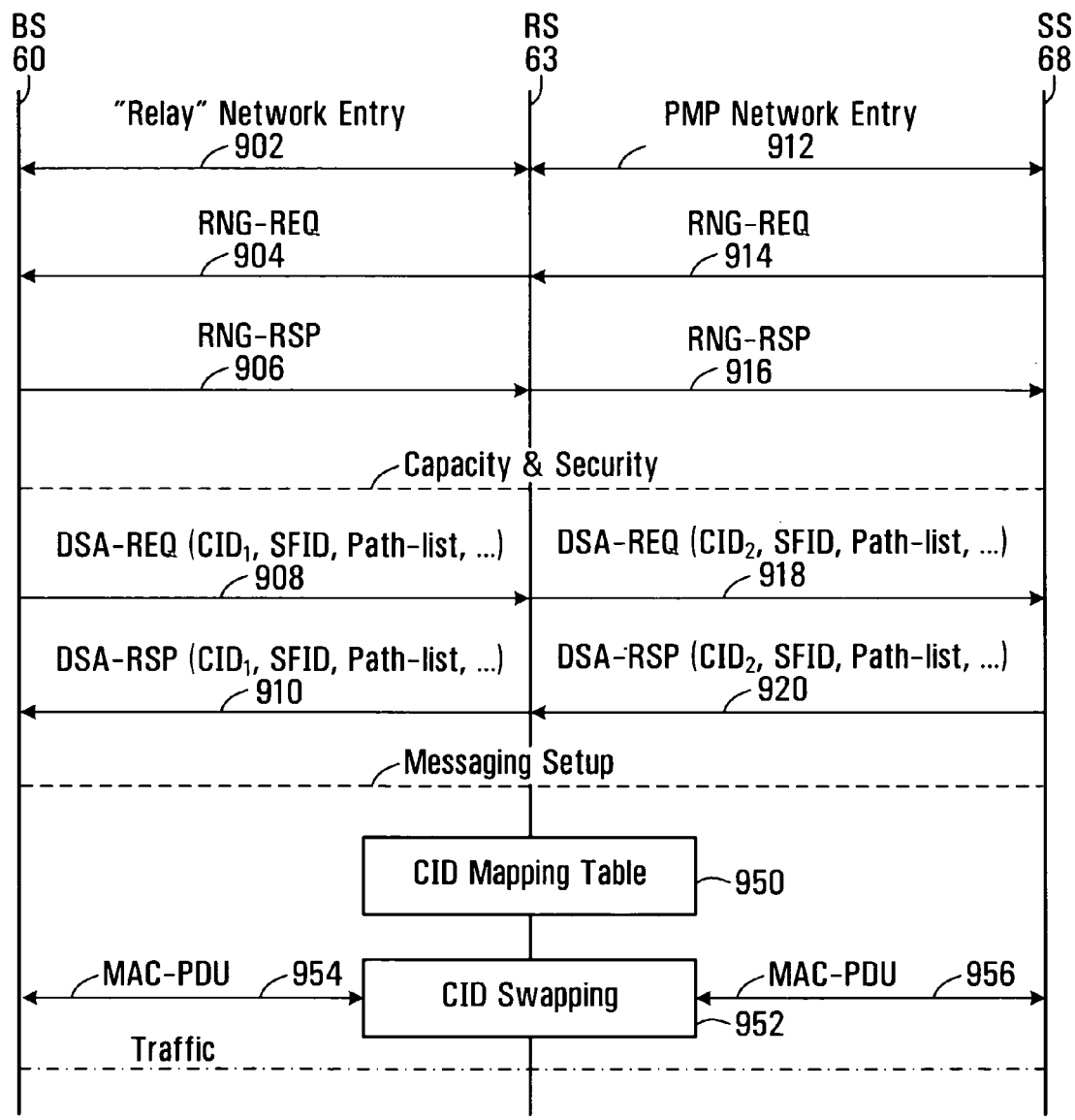
FIG. 10 is a signalling flow diagram illustrating control/data message flow according to an embodiment of the invention.

FIG. 10 is a signalling flow illustrating control/data message flow according to an embodiment of the invention. FIG. 10 is described in conjunction with some elements already described in connection with FIG. 2.

Messages 902, 912, 904, 914, 906, and 916 represent capacity and security messages which are sent during network setup. RS 63 enters the network and "Relay" Network entry message is sent to/from BS 60. PMP Network Entry message 912 is then sent to/from SS 68. SS 68 enters the network and a RNG-REQ (ranging request) message 914 is sent to RS 63. RS 63 then sends a RNG-REQ (ranging request) message 904 to BS 60. BS 60 then sends a RNG-RSP (raging response) message 906 to RS 63. RS 63 then sends a RNG-RSP message 916 to SS 68.

The messaging setup phase is then illustrated through the transmission of signalling messages 908, 918, 910, and 920. In this embodiment, the generic DSx message referred to in FIG. 4 is a Dynamic Service Addition (DSA) messages. DSA-REQ (DSA Request) message 908 sent from BS 60 to RS 63 contains transport CID1, SFID, and MAC relay sub-header contains a path-list of node identifiers for BS 60, RS 63 and SS 68. After CID replacement at RS 63 in the manner previously described, DSA-REQ message 918 containing transport $CID_2$, SFID, and a path-list of node identifiers for BS 60, RS 63 and SS 68 is then sent to SS 68. In response, SS 68 sends DSA-RSP (DSP Response) message 920 containing transport $CID_2$, SFID, and a path-list of node identifiers for BS 60, RS 63 and SS 68 is then sent to RS 63. RS 63 then sends DSP-RSP message 910 containing transport $CID_1$, SFID, and a path-list of node identifiers for BS 60, RS 63 and SS 68 to BS 60.

The message traffic phase is then represented by CID mapping table 950 contained in RS 63, MAC-PDU 954, CID swapping function 952, and MAC-PDU 956. This is the second embodiment of the message traffic phase described above in connection with FIG. 10. An incoming MAC-PDU 954 from BS 60 containing a CID will arrive at BS 63. CID swapper 952 will use CID mapping table 950 to swap ingress $CID_1$ with egress $CID_2$. MAC-PDU 956 will then be routed to SS 68. Message traffic can also be routed in the uplink direction from SS 68, RS 63 to RS 60 as is shown by the double arrowhead lines.

As described above, PMP multi-hop relay provides CID swapping at each RS to provide an end-to-end CID label path between a BS and a SS. The multi-hop relay protocol supports connection orientated data relay in IEEE 802.15. The protocol can be applied to fixed, nomadic and mobile RS relay topology. It is also backwards compatible with the existing IEEE 802.16 standard with only minor changes in the current interface. It is also easy to migrate from relay mode to mesh mode. Support is provided for both OFDM and OFDMA.

In some embodiments the PMP multi-hop relay is compatible with IEEE 802.15. In some embodiments, a RS is utilized between a BS and a SS. In some embodiments multiple RS are located between a BS and a SS. Some implementations are used as an alternative to a single hop PMP architecture. Some implementations are used in conjunction with a single hop PMP architecture.

In some embodiments, the BS has a fixed location. In some implementations one or more RS have fixed locations. In other implementations one or more RS are nomadic or mobile. The SS is fully mobile-enabled. However, in some embodiments the SS may be stationary. Mobile RS and SS may relocate to other cells having a different BS as well as within the same cell.

In some embodiments, the present invention provides an approach for end-to-end connection management in a multi-tier PMP topological network architecture in 802.16 networks. The approach can also be applied to a fully mesh 802.16 access network.

In some embodiments, the present invention supports fast re-route for SS handoff by on-demand signalling or pre-build-up CID tunnel. In some relay nodes, there is a routing controller which handles source routing protocols for route creation and maintenance. The routing controller interfaces with the CID distribution controller to provide the routing paths for connection oriented creation and maintenance. CID swapping can support these functions by providing an Application Program Interface (API) to these control modules.

Numerous modifications and variations of the present invention are possible in light of the above teachings. It is therefore to be understood that within the scope of the appended claims, the invention may be practised otherwise than as specifically described herein.

The invention claimed is:

1. A method for routing messages in a point-to-multipoint (PMP) wireless multi-hop relay network comprising a base station, at least one relay station, and a subscriber station, the method comprising:
   a. the at least one relay station receiving a signalling message containing a path list from the base station of the PMP wireless multi-hop relay network, and an initial connection identifier (CID) for a connection between the base station and one of the at least one relay stations;
   b. the at least one relay station of the PMP wireless multi-hop relay network receiving the signalling message and replacing the CID contained in said signaling message with a new CID and forwarding the signalling message with the new CID, and
   c. wherein step b. is repeated by one or more additional relay stations until the subscriber station is reached.

2. The method of claim 1 wherein the path list has a starting point and an ending point, the starting point of the path list being a node identifier for the base station and the ending point of the path list being a node identifier for the subscriber station.

3. The method of claim 2 wherein the path list is a set of node identifiers for all nodes between the base station and the subscriber station.

4. The method of claim 1 wherein the path list is stored in a Medium Access Control (MAC) sub-header.

5. The method of claim 1 wherein the initial CID and the new CID are tunnel CIDs.

6. The method of claim 1 wherein the initial CID and the new CID are transport CIDs.

7. The method of claim 1 wherein the initial CID is stored in a Dynamic Service (DSx) message.

8. The method of claim 7 wherein the DSx message is a Dynamic Service Addition (DSA) message.

9. The method of claim 1 further comprising:
the at least one relay station creating an entry in a CID mapping table, the CID mapping table containing entries for each CID received in a signalling message, and for each new CID replaced.

10. The method of claim 1, wherein the method is applied to a WiMAX wireless network.

11. The method of claim 1 further comprising,
d. the at least one relay station receiving a frame containing a DL MAP and at least one DL Burst, the DL MAP containing a CID stack for a connection between the base station and one of the at least one relay stations;
e. the at least one relay station retrieving a new CID stack from a CID mapping table, and replacing the CID stack contained in said DL MAP with the new CID stack and forwarding the frame with the new CID stack, and
f. wherein step e. is repeated by the one or more additional relay stations until the subscriber station is reached.

12. The method of claim 1 further comprising,
d. the at least one relay station receiving a frame containing a DL MAP and at least one DL burst, the DL burst containing one or more Medium Access Control (MAC) messages but not containing a CID stack, each of the one or more MAC messages containing an initial transport CID for a connection between the base station and one of the at least one relay stations;
e. the at least one relay station replacing the transport CID contained in at least one of said MAC messages with a new transport CID and forwarding the MAC message with the new transport CID, and
f. wherein step e. is repeated by the one or more additional relay stations until the subscriber station is reached.

13. The method of claim 1 further comprising,
d. the at least one relay station receiving a MAC PDU containing a transport CID provided by the subscriber station;
e. the at least one relay station creating a relay sub-header for said MAC PDU, the relay sub-header containing an initial tunnel CID;
f. wherein one of the one or more additional relay stations is configured to receive the MAC PDU and relay sub-header and replace the tunnel CID contained in said relay sub-header with a new tunnel CID and forward the MAC PDU and relay sub-header with the new tunnel CID, and
g. wherein step f. is repeated by until the subscriber station is reached.

14. A relay station in a point-to-multipoint (PMP) wireless multi-hop relay network, the relay station comprising:
a memory storing a CID mapping table;
a CID distribution controller, configured to:
receive a wirelessly transmitted signaling message sent from another station in the PMP wireless multi-hop relay network, the signalling message containing an ingress CID and a path list,
allocate a corresponding egress CID based on the path list, and
create an entry in said CID mapping table for each of the ingress CID and its corresponding egress CID; and
a CID swapper, configured to replace the ingress CID in a MAC PDU with the egress CID.

15. The relay station of claim 14 wherein the ingress CID and the egress CID are tunnel CIDs.

16. The relay station of claim 14 wherein the ingress CID and the egress CID are transport CIDs.

17. The relay station of claim 14 wherein the network is a WIMAX network.

18. The relay station of claim 14 wherein the path list is a set of node identifiers for all nodes between a base station and a subscriber station.

19. The relay station of claim 14 wherein the path list is stored in a Medium Access Control (MAC) sub-header.

20. The relay station of claim 19 wherein the DSx message is a Dynamic Service Addition (DSA) message.

* * * * *